United States Patent

[11] 3,615,470

| [72] | Inventor | June Singletary, Jr.<br>Raleigh, N.C. |
|---|---|---|
| [21] | Appl. No. | 669,114 |
| [22] | Filed | Sept. 20, 1967 |
| [45] | Patented | Oct. 26, 1971 |
| [73] | Assignee | Corning Glass Works<br>Corning, N.Y. |

[54] FABRICATION OF HELICAL PATTERNS ON CYLINDRICAL SURFACES
2 Claims, 8 Drawing Figs.

[52] U.S. Cl. .................................................. 96/37,
96/36.2, 355/1, 350/96
[51] Int. Cl. .................................................. G03c 5/00
[50] Field of Search ........................................... 96/36.2, 37,
38.4; 355/1; 350/96

[56] References Cited
UNITED STATES PATENTS

| 1,597,487 | 8/1926 | St. Clair.................... | 350/96 |
| 1,751,584 | 3/1930 | Hansell....................... | 350/96 |
| 2,982,175 | 5/1961 | Eisler ......................... | 350/96 |
| 3,029,717 | 4/1962 | Hildebrandt ............... | 350/96 |
| 3,163,080 | 12/1964 | Miller......................... | 350/96 |
| 1,658,509 | 2/1928 | Beebe......................... | 96/37 |
| 1,692,554 | 11/1928 | Leiter......................... | 96/38.4 |
| 3,125,013 | 3/1964 | Herrick, Jr. et al........... | 355/1 |

FOREIGN PATENTS

| 780,976 | 8/1957 | Great Britain................ | 355/1 |
| 784,761 | 10/1957 | Great Britain................ | 96/36.2 |

OTHER REFERENCES

George H. Lunn, Brit. Jrnl. of Photo., 21 Aug. 64, pp. 675–677.

*Primary Examiner*—Norman G. Torchin
*Assistant Examiner*—John Winkelman
*Attorneys*—Clarence R. Patty, Jr., Walter S. Zebrowski and William J. Simmons, Jr.

ABSTRACT: A method and apparatus are disclosed for forming a pattern by a photoresist technique on a surface which does not readily lend itself to exposure by light from a photographic negative. This method is particularly useful for the formation of patterns on nonplanar surfaces and surfaces which are not easily accessible, such as the inner surface of a hollow cylinder.

PATENTED OCT 26 1971    3,615,470

INVENTOR.
JUNE SINGLETARY Jr.
BY
William J. Simmons Jr.
ATTORNEY

FABRICATION OF HELICAL PATTERNS ON CYLINDRICAL SURFACES

BACKGROUND OF THE INVENTION

In the past, resistors, heaters, conductors, printed circuits, microcircuits and the like have been formed by applying resistive or electroconductive coatings on glass, ceramic and other nonconductive substrates. These coatings, consisting of metallic and/or metallic oxide compositions were applied in very thin films by various methods such as sputtering, evaporating, brushing, spraying, stenciling, dipping, silk screening and others. When such coatings were to be applied in precise patterns, a continuous coating of resistive or electroconductive material was applied to the substrate followed by a coating of a photoresist. An image from a photographic negative was then sharply focused on the coating to expose a pattern therein.

It has been found difficult to project a photographic image onto a nonplanar substrate in order to use the photoresist technique to form a patterned coating on the substrate. Examples of nonplanar substrates which are particularly difficult to coat by the photoresist technique are the external surface of a cylinder and the internal surface of a cylindrical bore. Machining methods have been used to produce patterned coatings on some nonplanar surfaces. For example, a helical conductive path can be produced on the external surface of a cylinder by coating the cylinder with a conductive material and then removing the undesired portions by a machining method such as grinding, said blasting or the like. Machining methods may be satisfactorily employed if the substrate material is strong enough to withstand the mechanical forces involved. However, when a substrate material is weak or brittle, machining methods cannot be employed. For example, an attempt was made to form helical conductors on small glass-ceramic rods by grinding a helical pattern into a rod, firing a coating of conductive material on a rod, and polishing off the excess metal leaving only the metal helix within the helical groove. This method resulted in an excessive amount of breakage during the grinding step, and some breakage occurred during the polishing step.

SUMMARY OF THE INVENTION

It is therefore an object of this invention to provide a method and apparatus for forming patterned coatings on nonplanar surfaces which are not easily accessible.

A further object of this invention is to provide a method and apparatus for forming patterned coatings on non-machinable substrates.

Another object of this invention is to provide a novel method and apparatus for exposing a pattern on a surface of photoresist.

Still another object of this invention is to provide a method for forming a helical path of electrically conductive material on the surface of a dielectric cylinder without applying mechanical force to the cylinder.

Briefly, the method of forming patterned coatings in accordance with this invention is as follows. A layer of photoresist is applied to a surface which may have a coating of material thereon which is to be patterned. An optical fiber is provided for directing a beam of light to a portion of the layer of photoresist, the wavelength of the light being appropriate for exposing the photoresist. Relative movement between the optical fiber and the layer of photoresist is established so that the desired pattern is exposed in the layer. The photoresist is then developed.

Other objects, features and advantages of this invention will become apparent during the course of the following detailed description and the attached drawings, on which, by way of example only the preferred embodiments of this invention are illustrated.

DETAILED DESCRIPTION

Figure 1:
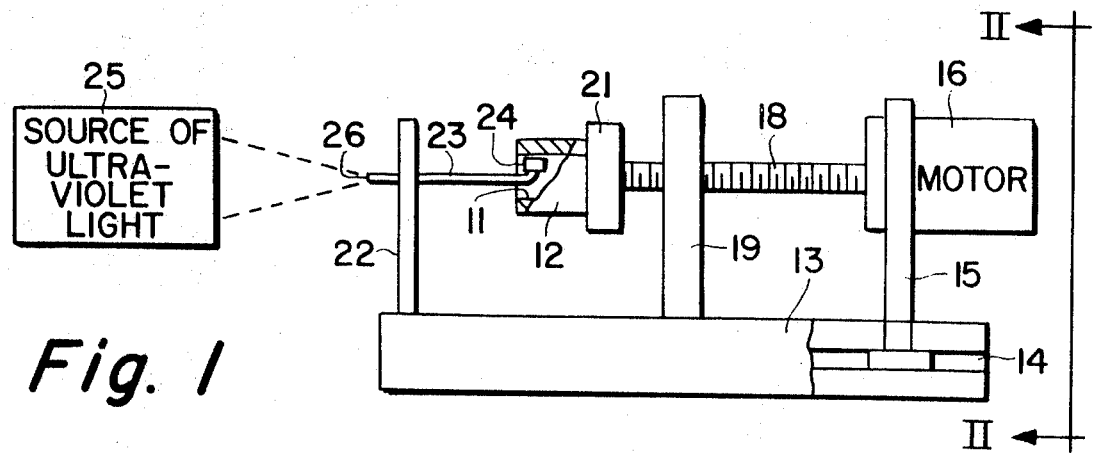
FIG. 1 is a side elevational view of an apparatus for exposing a helical path on the inner surface of a hollow cylinder.
Figure 2:
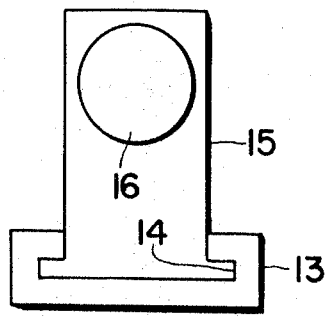
FIG. 2 is an end view of FIG. 1 looking in the direction of the arrows II–II in FIG. 1.

Referring to FIGS. 1 and 2 there is shown an apparatus for exposing a helical path along the inside surface 11 of a hollow cylinder 12. The apparatus consists of a base member 13 having a slot 14 therein which is T-shaped in cross section. The slot 14 provides a path for the motor support member 15 so that the movement of a motor 16 which is mounted thereon is restricted to a path which lies longitudinally along the support member 13. A portion of the base member 13 is shown removed (FIG. 1) to illustrate the slot 14 and the manner in which the base of the motor support member 15 is situated therein. The threaded shaft 18 of the motor 16 is supported by a member 19 having tapped bore therein so that rotation of the shaft 18 causes movement thereof relative to the member 19. A chuck 21, located on the end of the shaft 18, supports a workpiece such as the hollow cylinder 12. A light conducting optical fiber 23 is supported by the member 22 so that it may extend into the hollow cylinder 12. The end of the fiber from which light is emitted has a 90° bend and contains an end cap 24. A light source 25 directs a beam of light toward end 26 of optical fiber.

Figure 3:
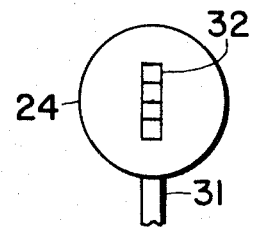
FIG. 3 is an enlarged end view of an optical fiber bundle which may be used to provide the exposing light in the apparatus of FIG. 1.
Figure 4:
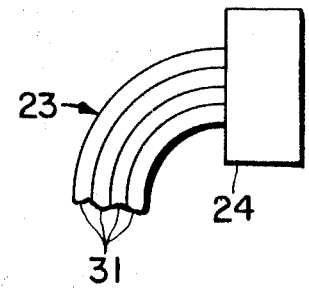
FIG. 4 is a side view of the optical fiber bundle of FIG. 3, FIGS. 5 and 6 are end and side views respectively showing a single optical fiber which can be used as the exposure light source.

The optical fiber 23 may consist of a plurality of fibers 31 which are secured together as shown in FIGS. 3 and 4. The cap 24 on the end of the fibers 31 contains a slot 32 in the dimensions of which are determined by the width of the helical path which is to be exposed.

Figure 5:
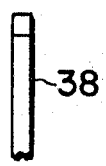
Figure 6:
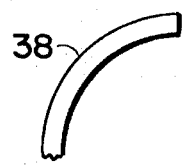

As illustrated in FIGS. 5 and 6, the optical fiber may consist of a single fiber 38. Such a fiber could be used when it is desired to expose a very narrow path. If it were desired, the fiber 38 could contain a cap such as that shown in FIGS. 3 and 4 having a slot therein which would further reduce the area from which light could be emitted.

The utilization of the apparatus of FIG. 1 to form a helical conductor on the inner surface 11 of the cylinder 12 will now be described. In general, the surface preparation and the photoresist application and development may be carried out in accordance with the recommendations set forth in Kodak Photosensitive Resists for Industry, Kodak Publication No. P–7, 1962, a copy of which may be obtained from Sales Service Division, Eastman Kodak Company, Rochester, New York. The surface 11 is cleaned and a coating of silver is applied thereto. The silver coating is then polished and cleaned mechanically and chemically. A suitable photoresist such as that sold under the trade name of Kodak Photo Resist is then applied while the cylinder is being whirled to provide an even coating. The photoresist is dried at 120° C. The cylinder is then attached to the chuck 21 and the light source 25 is turned on for a period of time sufficient to permit the light output therefrom to stabilize. The motor 16 is then started, causing the cylinder 12 to rotate and advance toward the support member 22 so that the light emitted by the optical fiber exposes a helical path along the surface 11. For the edge of the helical conductor to be as sharp as possible, the end cap 24 can be tilted at an angle which is dependent on the pitch of the helix. The sides of the slot 32 will then be parallel to the helical path being exposed. The cylinder is then removed from the chuck 21 and the photoresist is developed by immersion in a photoresist developer. After rinsing thoroughly the exposed silver is etched in a 1 percent chromic acid solution at 65° C. After etching, the photoresist remaining on the silver is removed by firing at 750° F. The helix is then copper flashed and silver plated to the desired thickness.

The light source 25 must provide ultraviolet light when the heretofore noted Kodak Photo Resist is used. The surface on which the pattern is being exposed should be moved at a rate of 3 to 6 diameters of the optical fiber per minute if a 150 watt mercury light source is used for the source. If a higher power source is used, the speed can be raised proportionately. In order to achieve the desired rate of exposure, a 1 r.p.m. motor was used.

Figure 7:
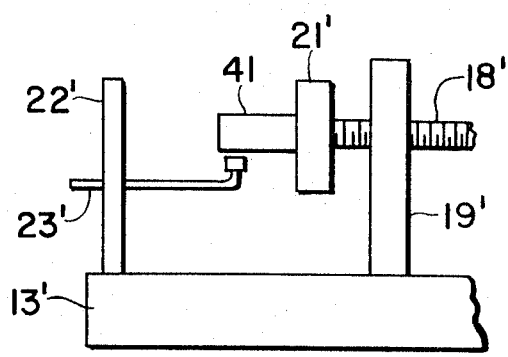
FIG. 7 shows a modified view of FIG. 1 for the exposure of a helical path on the external surface of a cylinder.

The embodiment shown in FIG. 7 illustrates how the apparatus of FIG. 1 can be modified to expose a helical path along the outer surface of a cylinder. In this FIG. components which are similar to those shown in FIG. 1 are designated by primed reference numerals. A cylindrical rod 41 is mounted in the chuck 21' so that it will be rotated and advanced with respect to the end cap 24' of the optical fiber 23'. In this FIG. the optical fiber 23' is supported in a lower position along the support member 22' so that the end cap 24' is situated adjacent the external surface of the cylinder 41. It is obvious that an optical fiber having a 90° bend is not necessary for this embodiment, and, therefore, the fiber 23' could be replaced by a straight fiber located perpendicular to the axis of the cylinder 41. In a manner similar to that described with respect to FIG. 1 the light emitted by the slotted end cap 24' exposes a helical path along the external surface of the rod 41.

Figure 8:
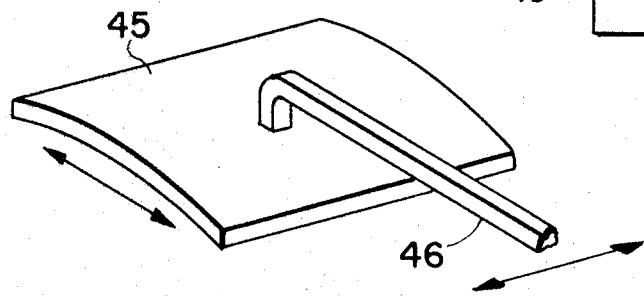
FIG. 8 illustrates that an optical fiber can be used to expose a pattern on any surface by causing relative movement between the surface and the fiber.

The surface on which a pattern is to be fabricated can either be moved while the position of the fiber remains fixed (FIG. 1) or the fiber can be moved while holding the surface fixed by using a suitable long and flexible optical fiber. FIG. 8 illustrates an embodiment in which an optical fiber 46 moves in a first direction illustrated by the arrows adjacent thereto while the substrate 45 moves in a direction perpendicular to the direction of movement of the fiber. Thus, the light from an optical fiber can expose a desired pattern on a substrate having almost any type of surface curvature.

Although the specific example described herein utilizes a negative photoresist that is sensitive to ultraviolet light, other photoresists of the positive or negative type which are sensitive to various wavelengths of light are available and can be used equally as well in practicing this invention.

I claim:

1. A method of forming a helical coating on the internal wall of a cylindrical bore comprising the steps of applying to said internal wall a coating of a material which is to be formed into a helical coating, applying a layer of photoresist to said coating, providing light transmitting means including at least one optical fiber having a light emitting end and a light receiving end, introducing into said light receiving end light, the wavelength of which is appropriate for exposing said photoresist, disposing said light emitting end in said cylindrical bore adjacent to said layer, the beam of light emitted from said light emitting end exposing that portion of said layer immediately adjacent to said light emitting end, said exposed portions being determined solely by the relative positions of said light emitting end and said layer, rotating said cylindrical bore, causing relative longitudinal movement between said light emitting end and said layer, so that said layer is exposed along a helical path, developing said exposed layer of photoresist to remove areas thereof as determined by said exposed portions, removing that portion of said coating material which is not covered by the remaining photoresist and, removing the remaining photoresist to expose a helical layer of said coating material.

2. A method in accordance with claim 1 wherein the step of causing relative longitudinal movement comprises maintaining said light emitting end in a fixed position while rotating said cylindrical bore and concurrently advancing said cylindrical bore longitudinally with respect to said light emitting end.